United States Patent [19]
Nishimura

[11] Patent Number: 4,691,153
[45] Date of Patent: Sep. 1, 1987

[54] METHOD OF CONTROLLING POSITIONING OF ROTOR OF STEPPING MOTOR

[75] Inventor: Makoto Nishimura, Yokohama, Japan

[73] Assignee: Tokiko, Ltd., Kawasaki, Japan

[21] Appl. No.: 827,169

[22] Filed: Feb. 7, 1986

[30] Foreign Application Priority Data

Feb. 9, 1985 [JP] Japan .................................. 60-24131

[51] Int. Cl.$^4$ .............................................. H02P 8/00
[52] U.S. Cl. ...................................... 318/696; 318/685
[58] Field of Search .................. 318/696, 685; 360/75, 360/77, 78

[56] References Cited

U.S. PATENT DOCUMENTS

Re. 32,075  1/1986  Harrison et al. ...................... 360/77
4,489,259  12/1984  White et al. .......................... 318/696

FOREIGN PATENT DOCUMENTS

52-24650  7/1977  Japan .
59-43411  3/1984  Japan .

Primary Examiner—William M. Shoop, Jr.
Assistant Examiner—Saul M. Bergmann
Attorney, Agent, or Firm—Cushman, Darby & Cushman

[57] ABSTRACT

A method of controlling the positioning of a rotor of a stepping motor is disclosed. During the last step in a movement of the rotor to a desired rest position thereof, the windings of the stepping motor are energized so as to produce a first magnetic vector, a position indicated by the first magnetic vector being displaced from the desired rest position in the direction of the movement of the rotor by a predetermined amount. This displacement of the first magnetic vector causes the rotor to overshoot the desired rest position by such an amount that a positioning error of the rotor due to a hysteresis characteristic of the rotor in the direction of the movement thereof is compensated. The windings are then energized to produce a second magnetic vector with the position indicated by this second magnetic vector coinciding with the desired rest position of the rotor. The energization of the windings may be performed in small steps to effect a vernier driving of the rotor.

4 Claims, 11 Drawing Figures

METHOD OF CONTROLLING POSITIONING OF ROTOR OF STEPPING MOTOR

BACKGROUND OF THE INVENTION

1. Field of the Invention

This invention relates to a method of controlling positioning of a rotor of a stepping motor, and, in particular, to such a method which is suitable for use in a head actuator of a disc storage unit.

A stepping motor can precisely move a driven member or a rotor in steps and is therefore suitable for driving a head mechanism of a disc storage unit. As a result, most of the disc drive units recently developed employ stepping motors as the actuator means for the heads.

A rotor of a stepping motor however exhibits a hysteresis when driven in opposite directions, and a head carriage coupled to the rotor also has an inherent hysteresis characteristic. Those hysteresis characteristics result in an error in positioning of the head when the head is moved in both forward and reverse directions.

In a conventional disc storage unit, the control circuit of the stepping motor is so designed that the head is moved always in a predetermined direction before being positioned on desired tracks. More specifically, in the case of the predetermined direction being the inward direction (i.e., the direction from the outer side to the inner side of the disc), the head is moved in the inward direction when a track disposed inwardly of the current track is to be accessed. On the other hand, when a desired track is disposed outwardly of the current track, the head is first moved outwardly to a track disposed further outwardly of the desired track and then moved inwardly to access the desired track.

With this conventional method, however, the time required to seek a track disposed inwardly of the current track and that required to seek a track disposed outwardly of the current track differ from each other even when the distances from the current track to the inwardly and outwardly disposed tracks are equal to each other.

SUMMARY OF THE INVENTION

It is therefore an object of the present invention to provide a method of controlling the positioning of a rotor of a stepping motor in which the rotor can be precisely moved to a desired position with substantially zero hysteresis even when the rotor is driven in both forward and reverse directions.

It is another object of the invention to provide such a method which can render the times required to seek inner and outer tracks equally spaced from the current track equal to each other.

According to an aspect of the present invention, there is provided a method of controlling the positioning of a rotor of a stepping motor having phase windings, the method comprising the steps of energizing the windings within the last step in a movement of the rotor to a desired rest position thereof so as to produce a first magnetic vector, a position indicated by said first magnetic vector being displaced from said desired rest position of the rotor in the direction of said movement thereof by a predetermined amount; and subsequently energizing the windings so as to produce a second magnetic vector, a position indicated by said second magnetic vector coinciding with said desired rest position of the rotor.

DESCRIPTION OF THE PREFERRED EMBODIMENTS OF THE INVENTION

The present invention will now be described with reference to the accompanying drawings.

Figure 1:
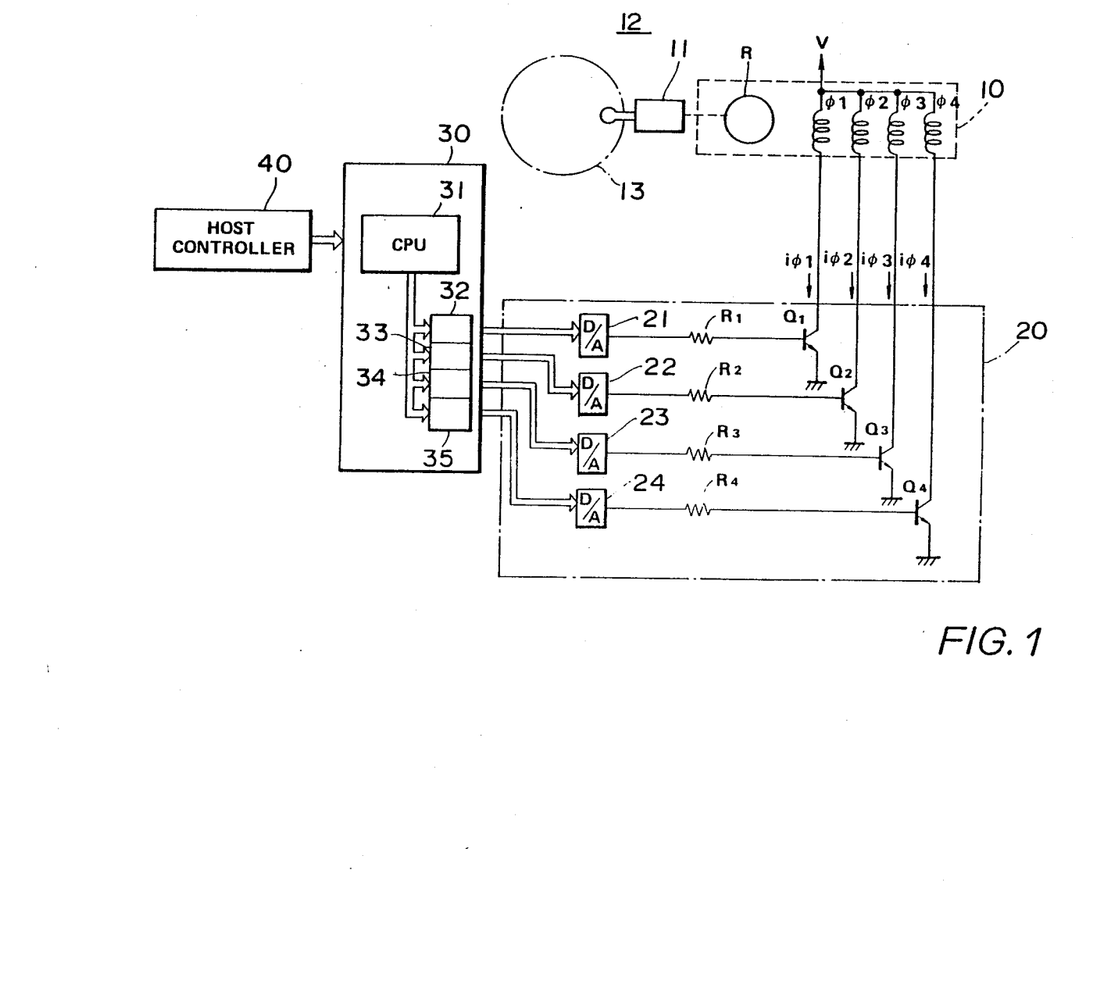
FIG. 1 is a block diagram of a control circuit for a stepping motor 10 in which a method of controlling positioning of a rotor of a stepping motor according to the present invention is used.

FIG. 1 shows a control circuit for a stepping motor 10 in which a method of controlling the positioning of a rotor of a stepping motor according to a first embodiment of the present invention is used. The motor 10 is of a four-phase unipolar drive type and comprises a rotor R and four windings $\phi 1$, $\phi 2$, $\phi 3$ and $\phi 4$. The rotor R is operatively connected to a head carriage 11 of a disc storage unit 12. The windings $\phi 1$, $\phi 2$, $\phi 3$ and $\phi 4$ are connected each at one end to a source of a voltage V, and the other ends of these windings are connected respectively to collectors of four NPN transistors $Q_1$ to $Q_4$ provided in a drive circuit 20. Bases of the transistors $Q_1$ to $Q_4$ are supplied through resistors $R_1$ to $R_4$ with output signals of D/A converters (Digital-to-Analog converters) 21 to 24, respectively. The control circuit shown in FIG. 1 further comprises a controller 30 which includes a central processing unit (CPU) 31 and output ports 32 to 35. The CPU 31 contains therein a control program which causes the output ports 32 to 35 to output digital data determined in accordance with commands and data fed thereto from a host controller 40. The digital data thus outputted from the output ports 32 to 35 are supplied to the D/A converters 21 to 24, respectively.

With this construction, by appropriately arranging the control program executed by the CPU 31, the energization and de-energization of the windings $\phi 1$, $\phi 2$, $\phi 3$ and $\phi 4$ and the amount of each of phase currents $i_{\phi 1}$ to $i_{\phi 4}$ passing respectively through the windings $\phi 1$ to $\phi 4$ can be controlled in a desired manner.

The first embodiment of the present invention will now be described, wherein, by way of example, a positioning operation of the rotor R by the energization of both of the windings $\phi 1$ and $\phi 2$ is shown.

A description is first given as to the rest position of the rotor R when the rotor R is rotated one step in the forward direction by changing the energization of windings from the first-phase winding $\phi 1$ to the first-phase and second-phase windings $\phi 1$ and $\phi 2$ and also as to the rest position of the rotor R when the rotor R is rotated one step in the reverse direction by changing the energization of windings from the second-phase winding $\phi 2$ to the first-phase and second-phase windings $\phi 1$ and $\phi 2$.

For a better understanding the present invention, the rest position of the rotor R obtained by a conventional method will be described in relationship to FIG. 2.

Figure 2:
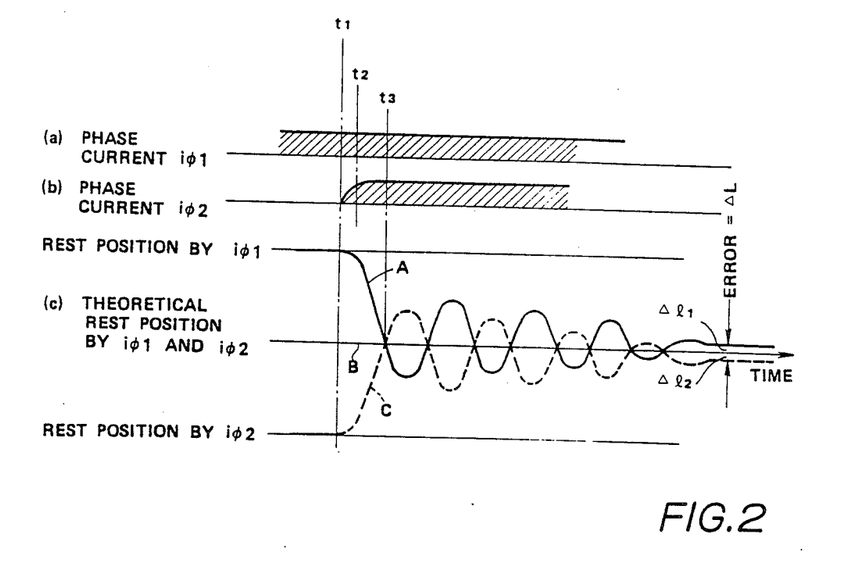
FIG. 2 is an illustration showing a positioning operation of a rotor of a stepping motor in a conventional method.
Figure 3:
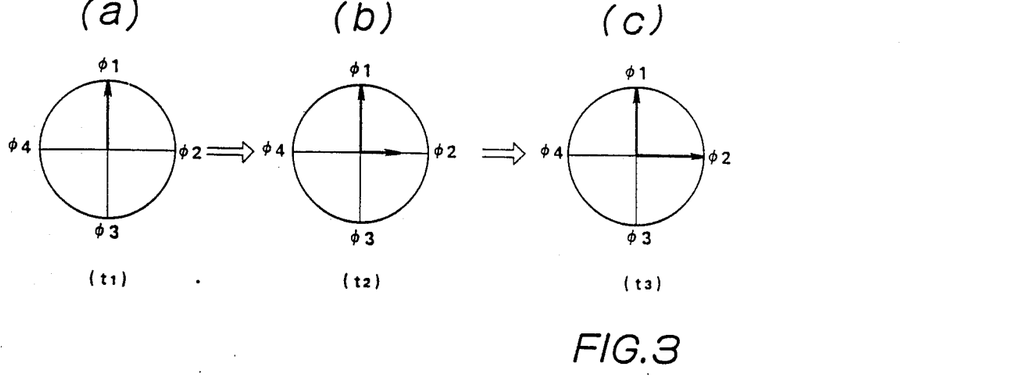
FIG. 3 is an illustration showing in vector representation the variation of the phase currents of the stepping motor in the conventional method.

FIG. 2 shows the amount of each of the phase-currents $i_{\phi 1}$ and $i_{\phi 2}$ and the rest position of the rotor R when the energization of windings is changed from the first-phase winding $\phi 1$ to the first-phase and second-phase windings $\phi 1$ and $\phi 2$. When a phase current $i_{\phi 2}$ of the same amount as the phase-current $i_{\phi 1}$ begins to flow (FIG. 2-(b)), the rotor R begins to be angularly moved, as indicated by a solid line A in FIG. 2-(c), in the direction of the theoretical rest position defined by the two phase currents $i_{\phi 1}$ and $i_{\phi 2}$ of the same amount, which position is indicated by a solid line B in FIG. 2-(c). In this case, the rotor R is subjected to a damped oscillation and finally stops at a position which deviates a distance $\Delta l_1$ from the theoretical position B in the direction of the rest position of the rotor R defined by the phase current $i_{\phi 1}$. FIGS. 3-(a), 3-(b) and 3-(c) are vector representations of the phase currents $\phi 1$ to $\phi 4$ at time $t_1$, time $t_2$ and time $t_3$ in FIG. 2, respectively.

Referring again to FIG. 2-(c), indicated by a broken line C is the angular movement of the rotor R when the energization of windings is changed from the second-phase winding $\phi 2$ to the first-phase and second-phase windings $\phi 1$ and $\phi 2$. As shown, the rotor R in this case is subjected to a damped oscillation having an inversed waveform of the damped oscillation of the rotor R in the former case, and finally stops at a position which is deviated a distance $\Delta l_2$ from the aforesaid theoretical rest position B defined by the phase currents $i_{\phi 1}$ and $i_{\phi 2}$. Thus, the two rest positions of the rotor R obtained respectively through its forward and reverse rotations differ from each other by a distance $\Delta L$ which is equal to $\Delta l_1 + \Delta l_2$. The value $\Delta L$ of this positioning error is constant at all rest positions of the rotor R.

A rest position of the rotor R obtained when the first embodiment of the invention is used will now be described.

In the case of changing the energization of the windings from the first-phase winding $\phi 1$ to the first-phase and second-phase windings $\phi 1$ and $\phi 2$, the windings $\phi 1$ to $\phi 4$ are once energized so that a magnetic equilibrium position, shifted in the direction of the winding $\phi 2$ by a predetermined distance from the theoretical rest position of the rotor R defined by the two phase currents $i_{\phi 1}$ and $i_{\phi 2}$ of the same amount, is obtained. More specifically, the windings $\phi 1$ to $\phi 4$ are first energized by such currents as those shown in FIG. 4-(a) or FIG. 4-(c). Then, the windings $\phi 1$ and $\phi 2$ are energized by the phase currents $i_{\phi 1}$ and $i_{\phi 2}$ of the same amount, as shown in FIG. 4-(b).

Figure 4:
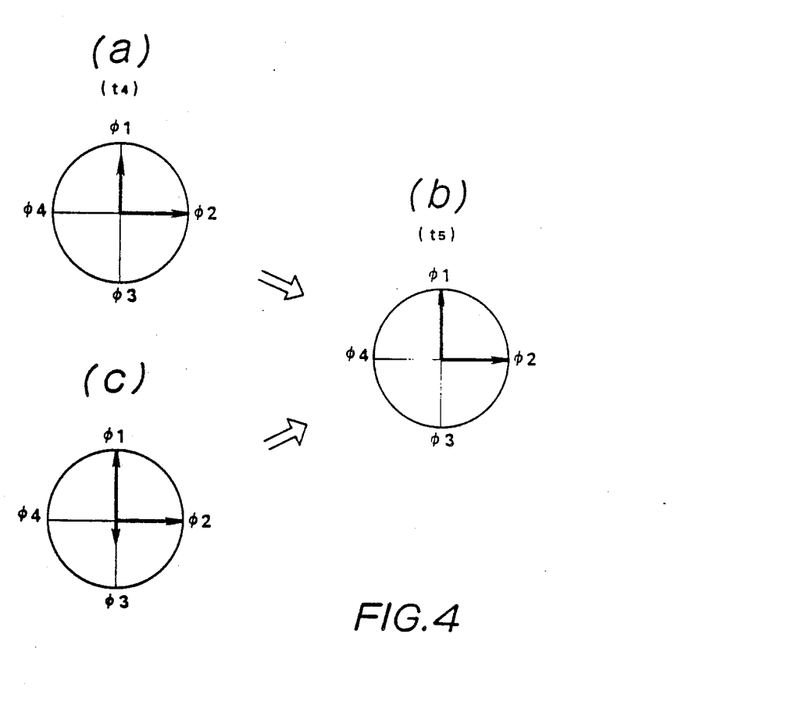
FIG. 4 is an illustration showing in vector representation the variation of the phase currents of the stepping motor 10 in the first embodiment of the present invention.
Figure 5:
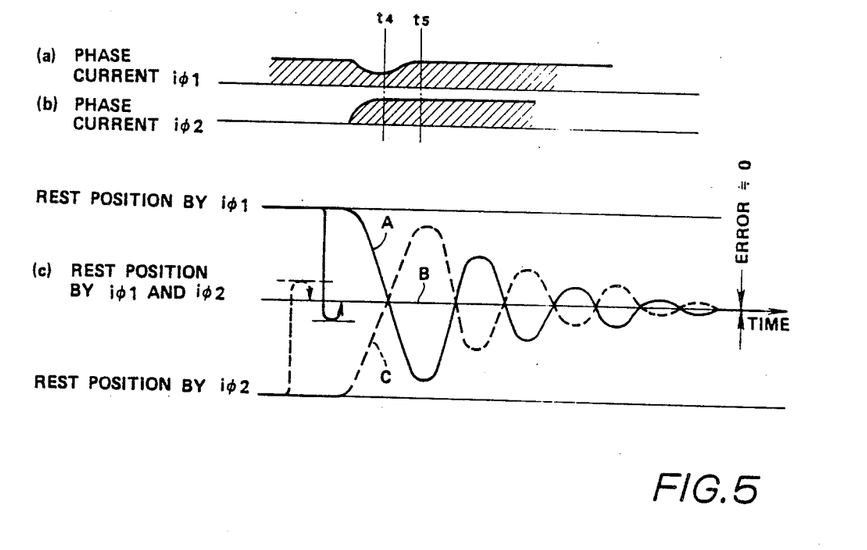
FIG. 5 is an illustration showing the waveforms of the phase currents $i_{\phi 1}$ and $i_{\phi 2}$ and the movement of the rotor R in the first embodiment of the invention.

FIGS. 5-(a) and 5-(b) respectively illustrate the waveforms of the phase currents $i_{\phi 1}$ and $i_{\phi 2}$ varied as shown in FIGS. 4-(a) and 4-(b). When the phase currents $i_{\phi 1}$ and $i_{\phi 2}$ are varied as shown in FIGS. 5-(a) and 5-(b), the rotor R first passes beyond or overshoots the theoretical rest position defined by the first-phase and second-phase currents $i_{\phi 1}$ and $i_{\phi 2}$ and reaches the rest position defined by the second phase current $i_{\phi 2}$, as indicated by a solid line A in FIG. 5-(c). The rotor R is then subjected to a damped oscillation of which center coincides with the theoretical rest position B defined by the phase currents $i_{\phi 1}$ and $i_{\phi 2}$, and finally stops at the theoretical rest position B. More specifically, the overshoot of the rotor R in the direction of the rest position defined by the phase current $i_{\phi 2}$ in the beginning of the oscillation thereof is of such an amount that the positioning error of $\Delta l_1$ shown in FIG. 2-(c) is compensated, so that the actual rest position of the rotor R coincides with the theoretical rest position B defined by the phase currents $i_{\phi 1}$ and $i_{\phi 2}$ of the same amount. As described before, FIGS. 5-(a) and 5-(b) show the waveforms of the phase currents $i_{\phi 1}$ and $i_{\phi 2}$ varied as shown in FIGS. 4-(a) and 4-(b), and the amounts of the phase currents $i_{\phi 1}$ and $i_{\phi 2}$ at times $t_4$ and $t_5$ corresponds to those shown in FIGS. 4-(a) and 4-(b), respectively. The rotor R can also be driven as indicated by the solid line A in FIG. 5-(c) by changing the amounts of the phase currents $i_{\phi 1}$ and $i_{\phi 2}$ as shown in FIGS. 4-(c) and 4-(b).

In the case where the energization of windings is changed from the second-phase winding $\phi 2$ to the first-phase and second-phase windings $\phi 1$ and $\phi 2$, the windings $\phi 1$ to $\phi 4$ are first energized so that a magnetic equilibrium position, shifted in the direction of the rest position defined by the phase current $i_{\phi 1}$ by a predetermined distance from the theoretical rest position B of the rotor R defined by the two phase currents $i_{\phi 1}$ and $i_{\phi 2}$ of the same amount, is obtained, whereby the rotor R overshoots the theoretical rest position B in the direction of the rest position defined by the phase current $i_{\phi 1}$ by a predetermined amount. Then, the amount of the phase currents $i_{\phi 1}$ and $i_{\phi 2}$ are varied so that both of them become equal to each other. According to this method, the rotor R is subjected to a damped oscillation whose center coincides with the theoretical rest position B defined by the phase currents $i_{\phi 1}$ and $i_{\phi 2}$ of the equal amount, and stops at this theoretical rest position B, as indicated by a broken line C in FIG. 5-(c).

Thus, in this embodiment, the rotor R stops accurately at the theoretical rest position defined for example by the first-phase and second-phase currents $i_{\phi 1}$ and $i_{\phi 2}$ of the same amount, that is to say, at the middle of the hysteresis error zone in the conventional method, irrespective of the direction of rotation of the rotor R. Also, the rotor R is subjected to the oscillation only within the final step, and the oscillation in the case of the forward rotation of the rotor R and that in the case of the reverse rotation of the rotor R are identical in waveform to each other, so that the times required to stop the rotor R are the same and short in the both cases.

The extent of the overshoot of the rotor R determined by the amount of the phase current $i_{\phi 1}$ shown in FIG. 4-(a) or of the phase current $i_{\phi 3}$ shown in FIG. 4-(c) can be obtained by an experiment, a calculation, or a simulation of the movement of the rotor R.

Figure 6:
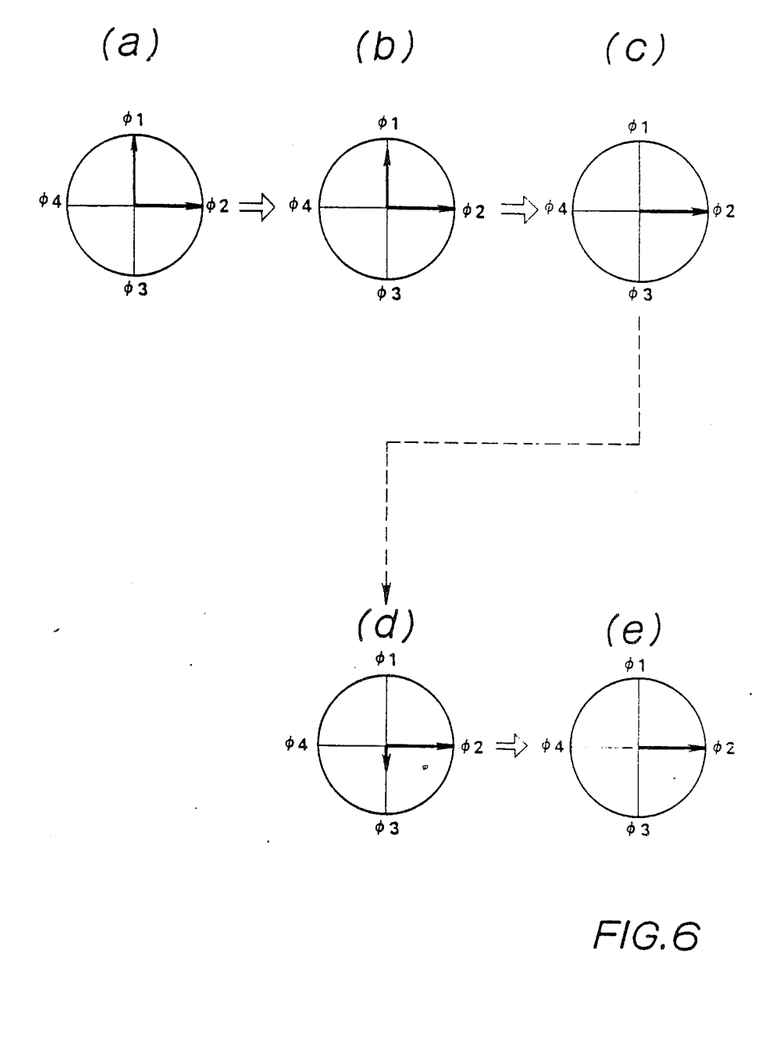
FIG. 6 is an illustration showing in vector representation the variation of the phase currents in the first embodiment of the invention.

The above is the case where the number of simultaneously energized phase windings is changed from one to two. One example of the manner of energization of the windings in the case where the number of simultaneously energized phase windings is changed from two to one is shown in FIG. 6. In the conventional method, the energization of the windings is changed as (a)→(b)→(c) in FIG. 6, while, in this embodiment, the energization of the windings is changed as (a)→(b)→(c)→(d)→(e) in FIG. 6. As shown, according to this embodiment, the windings are once energized so that a magnetic equilibrium position slightly shifted from the theoretical rest position defined by the phase current $i_{\phi 2}$ to the rest position defined by the phase current $i_{\phi 3}$ is obtained.

A second embodiment of the invention will now be described, wherein the control circuit of FIG. 1 is again used. This embodiment is identical in theory with the aforesaid first embodiment but is superior thereto in settling time.

Figure 7:
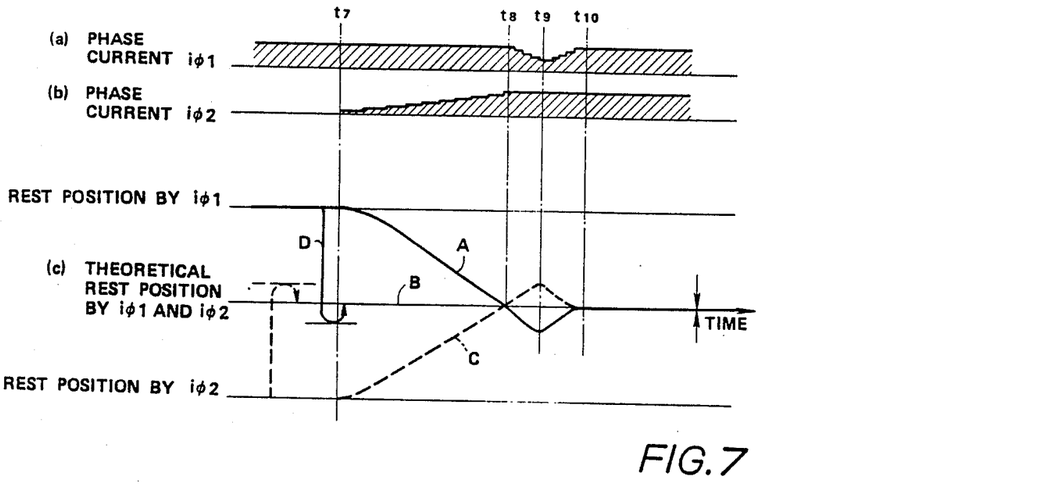
FIG. 7 is an illustration showing the waveforms of the phase currents $i_{\phi 1}$ and $i_{\phi 2}$ and the movement of the rotor R in the second embodiment of the invention.

A description will be first given as to the case where the energization of the windings is changed from the first-phase winding $\phi 1$ to the first-phase and second-phase windings $\phi 1$ and $\phi 2$. In this case, the second-phase current $i_{\phi 2}$ is gradually increased from the start time $t_7$ of the movement of the rotor R in small steps (for example, in ten small steps) while maintaining the amount of the first-phase current $i_{\phi 1}$ constant, as shown in FIGS. 7-(a) and 7-(b). As a result, the rotor R angularly moves from the rest position defined by the first-phase current $i_{\phi 1}$ to the rest position defined by the second-phase current $i_{\phi 2}$ at a substantially constant speed, as indicated by a solid line A in FIG. 7-(c). When the first-phase and the second-phase currents $i_{\phi 1}$ and $i_{\phi 2}$ become equal in amount to each other at the time $t_8$, the rotor R reaches the theoretical rest position defined by the first-phase and second-phase currents of the same amount.

During a period between the times $t_8$ and $t_9$, the first-phase current $i_{\phi 1}$ is decreased in small steps with the second-phase current $i_{\phi 2}$ being held constant. In this case, the first-phase current $i_{\phi 1}$ is decreased to such an extent that the rotor R overshoots the theoretical rest position B, defined by the first-phase and the second-phase currents $i_{\phi 1}$ and $i_{\phi 2}$ of the same amount, by a predetermined short distance, as shown in FIG. 7-(c). Then, during a period between the times $t_9$ and $t_{10}$, the first-phase current $i_{\phi 1}$ is increased in small steps with the second-phase current $i_{\phi 2}$ being kept constant so that the both phase currents $i_{\phi 1}$ and $i_{\phi 2}$ become equal in amount to each other at the time $t_{10}$. According to the above-described method of energization of the windings, the rotor R once overshoots the theoretical rest position B defined by the phase currents $i_{\phi 1}$ and $i_{\phi 2}$ of the same amount, and then reaches this theoretical rest position B at a constant speed from the side of the rest position defined by the second-phase current $i_{\phi 2}$, as indicated by a solid line D in FIG. 7-(c). Consequently, the actual rest position of the rotor R coincides with the theoretical rest position B defined by the phase currents $i_{\phi 1}$ and $i_{\phi 2}$ of the same amount.

The period between the times $t_7$ and $t_8$, between the times $t_8$ and $t_9$ and between the times $t_9$ and $t_{10}$ and the amount of decrease of the current $i_{\phi 1}$ during the period between the times $t_8$ and $t_9$ can be determined by, for example, an experiment or a calculation.

In the case where the energization of windings is changed from the second-phase winding $\phi 2$ to the first-phase and second-phase windings $\phi 1$ and $\phi 2$, the energization of the windings is performed in a manner described for the above case. In this case, the rotor R is rotated and stops as indicated by a broken line C in FIG. 7-(c).

Figure 8:
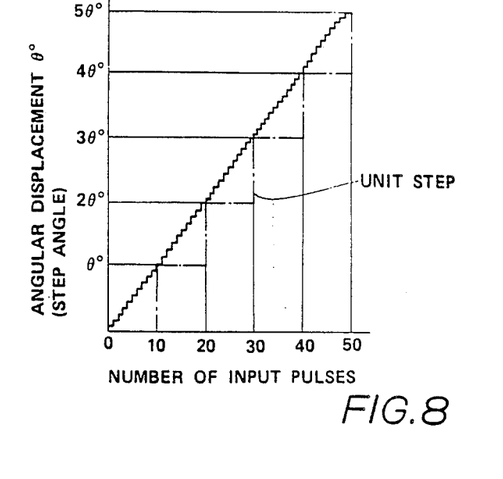
FIG. 8 is an illustration showing one example of the relation between the number of input pulses and the angular displacement of the rotor R in a vernier driving.

Thus, in this second embodiment, the rotor R stops at the theoretical rest position defined by the phase currents $i_{\phi 1}$ and $i_{\phi 2}$ of the same amount irrespective of direction of rotation thereof. The manner of changing phase currents in small steps is well known as "vernier driving". FIG. 8 shows one example of the relation between the number of input pulses and the angular displacement of the rotor R when vernier driving is effected. As will be appreciated from FIG. 8, the rotor is moved in small steps within one unit step of $\frac{1}{4}°$.

In the above second embodiment, the rotor R is not subjected to an oscillation, and therefore the rotor stops quickly. Thus, the invention according to this second embodiment is suitable for use in a disc storage unit in which a settling time of heads less than 10 ms is needed.

Also, the above embodiment can be applied to a disc storage unit in which the positioning of heads is performed in accordance with index servo information or sector servo information. A modified form of the second embodiment for such a disc storage unit will now be described with reference to FIG. 9.

Figure 9:
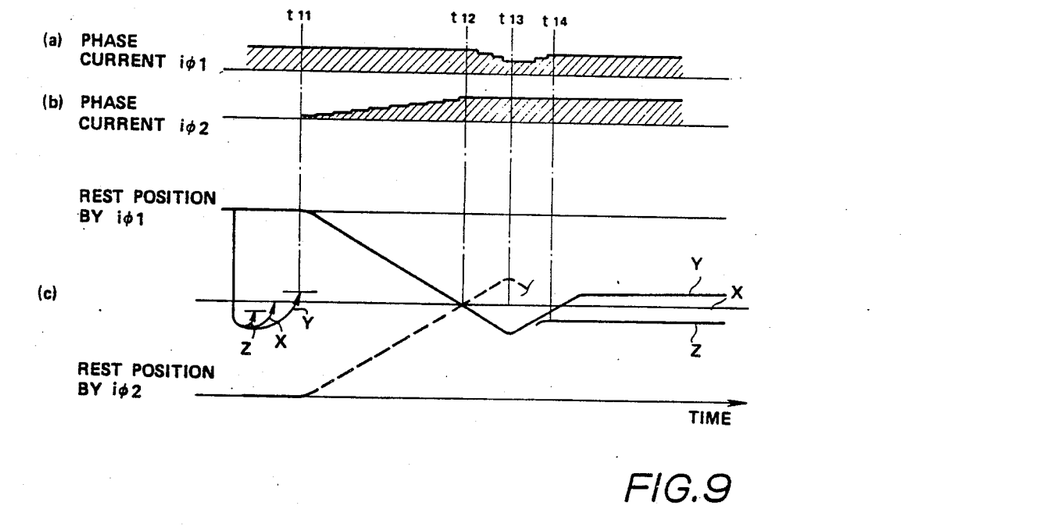
FIG. 9 is an illustration showing the waveforms of the phase currents $i_{\phi 1}$ and $i_{\phi 2}$ and the movement of the rotor R in a modified form of the second embodiment of the invention, wherein sector servo information is used.

In FIG. 9-(c), shown at x, y and z are examples of a target rest position of the rotor R obtained in accordance with a feed back signal such as sector servo information stored on a disc 13 (FIG. 1). It is assumed here that the target position z is now obtained from the feedback information. In this case, from time $t_{11}$ to time $t_{12}$, the phase current $i_{\phi 2}$ is increased in a manner described for the period between the times $t_7$ and $t_8$ in FIG. 7. Then, during the period between the times $t_{12}$ and $t_{13}$, the phase current $i_{\phi 1}$ is decreased in small steps by an amount determined in accordance with the feedback information. During the period between the times $t_{13}$ and $t_{14}$, the phase current $i_{\phi 1}$ is increased in small steps to a value which is smaller than that of the phase current $i_{\phi 2}$ by an amount determined by the feedback information. With this method, the rotor R once overshoots the target position z, approaches it from the side of the winding $\phi 2$, and finally stops accurately at the target position z. Thus, with this method, a positioning error of the head due to the hysteresis characteristics of the motor and the driving mechanism can be eliminated, and also the settling time of the head can be minimized.

Figure 10:
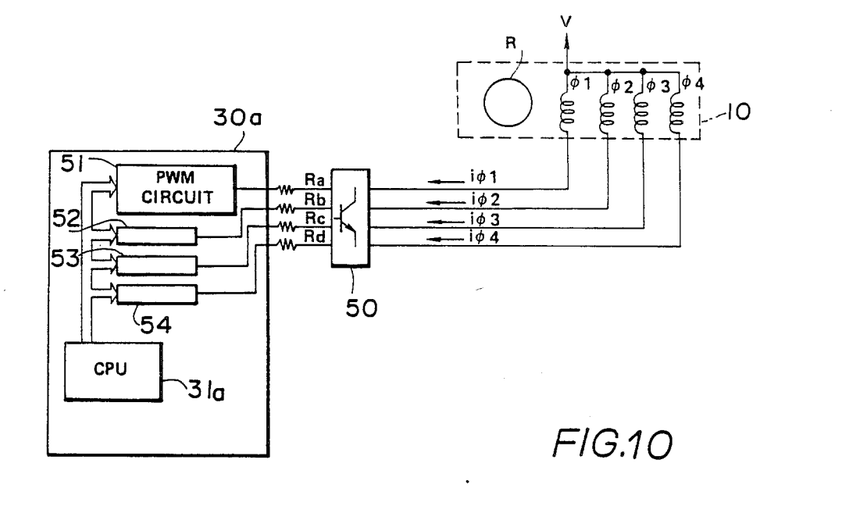
FIG. 10 is a block diagram of a modified form of the control circuit of FIG. 1.

In the above description, the control circuit shown in FIG. 1 is used, however, a control circuit shown in FIG. 10 can alternatively be used in the aforesaid embodiments.

In FIG. 10, the control circuit comprises an array 50 of four switching transistors of which collectors are connected respectively to the one ends of the windings $\phi 1$ to $\phi 4$ of the stepping motor 10. The switching transistors are driven by signals fed from a controller 30a through resistors Ra, Rb, Rc and Rd, respectively. The controller 30a includes a CPU 31a and four PWM (pulse width modulation) circuits 51 to 54 of an identical construction. In this case, the CPU 31a is programmed so as to cause the PWM circuits 51 to 54 to output pulse signals in accordance with commands and data fed from a host controller (not shown in FIG. 10) so that the switching transistors intermittently conduct to flow phase currents $i_{\phi 1}$ to $i_{\phi 4}$ of desired amounts through the windings $\phi 1$ to $\phi 4$.

Figure 11:
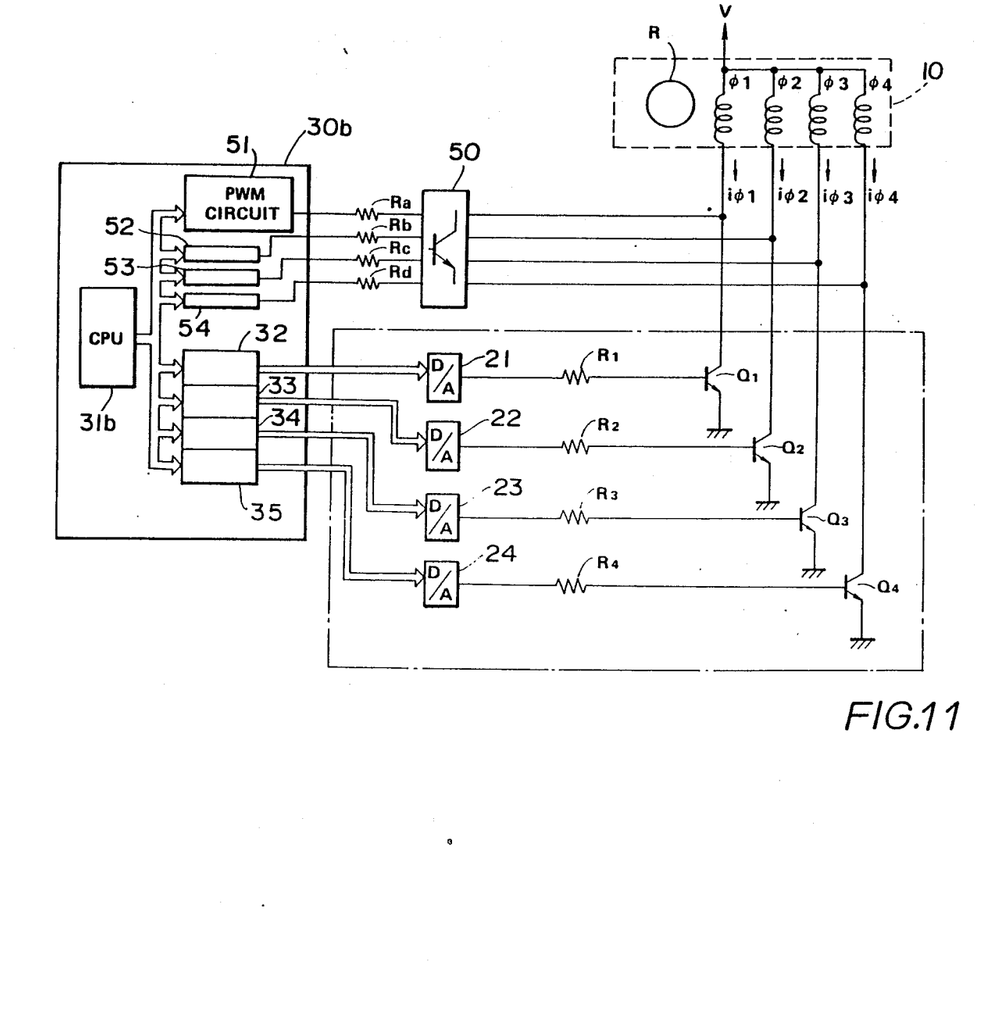
FIG. 11 is a block diagram of a further modified form of the control circuit of FIG. 1.

FIG. 11 shows another control circuit used in this invention which is a combination of the control circuit of FIG. 1 with that shown in FIG. 10. A CPU 31b provided in a controller 30b of this control circuit drives the switching transistor array 50 through the PWM circuits 51 to 54 to move the rotor R at a high speed to a position which is disposed one step before the desired stop position. The CPU 31b then drives the D/A converters 21 to 24 through the output ports 32 to 35 so that a vernier driving of the rotor R is effected. When the control circuit shown in FIG. 11 is used, the time required to move the rotor from a position to another can be remarkably shortened.

As described above, according to the present invention the following advantages are obtained:

(1) A driven member connected to a rotor of a stepping motor can be moved accurately to a desired position without being affected by the hysteresis characteristics of the rotor and the driven member; and (2) The driven member can be precisely moved in both forward and reverse directions, so that the times required to move the driven member to desired positions are equal to one another irrespective of the directions of movement of the rotor if the distances to the desired positions are equal.

What is claimed is:

1. A method of controlling the positioning of a rotor of a stepping motor having phase windings comprising the steps of:

(1) energizing the windings within the last step in a movement of the rotor to a desired rest position thereof so as to produce a first magnetic vector, a position indicated by said first magnetic vector being displaced from said desired rest position of the rotor in the direction of said movement thereof by a predetermined amount so that the rotor is caused to overshoot said desired rest position of the rotor by such an amount that a positioning error of the rotor due to a hysteresis characteristic thereof in the direction of said movement is compensated; and (2) subsequently energizing the windings so as to produce a second magnetic vector, a position indicated by said second magnetic vector coinciding with said desired rest position of the rotor.

2. A method of controlling positioning of a rotor of a stepping motor according to claim 1, wherein each of said energization and subsequent energization of the windings is effected in such a manner that a position indicated by a magnetic vector produced by said energization and subsequent energization of the windings moves from a rest position of the rotor in the penultimate step of said movement of the rotor to said position indicated by said first magnetic vector and from said position indicated by said first magnetic vector to said desired position in steps to implement a vernier driving of the rotor.

3. A method of controlling positioning of a rotor of a stepping motor according to claim 2, wherein, during each of those steps in said movement of the rotor other than said last step, the windings are energized such that a magnetic vector produced by said energization is changed from one state to another in a single process to move the rotor by one step.

4. A method of controlling positioning of a stepping motor according to any one of claims 2 or 3, wherein the rotor is operatively connected to a head of a disc storage unit having means for detecting a servo information recorded on a disc thereof, and wherein said desired rest position of the rotor is determined in accordance with said servo information.

* * * * *